United States Patent [19]
Eiland

[11] Patent Number: 5,919,021
[45] Date of Patent: Jul. 6, 1999

[54] FRONT LOADING GOOSE NECK TRAILER

[76] Inventor: Melvin C. Eiland, 437 W. Darvilla, Rockdale, Tex. 76567

[21] Appl. No.: 09/016,897

[22] Filed: Feb. 2, 1998

[51] Int. Cl.$^6$ .................................................. A01D 90/00
[52] U.S. Cl. ...................... 414/111; 414/24.5; 414/480; 414/491
[58] Field of Search ................................ 414/24.5, 24.6, 414/111, 491, 528, 480

[56] References Cited

U.S. PATENT DOCUMENTS

| | | | |
|---|---|---|---|
| 3,298,550 | 1/1967 | Schiltz | 414/491 |
| 3,341,039 | 9/1967 | Cranage | 414/111 X |
| 4,044,906 | 8/1977 | Schrag et al. | 414/491 X |
| 4,081,094 | 3/1978 | Pereira et al. | 414/491 X |
| 4,096,960 | 6/1978 | Gilmore | 414/491 X |
| 4,136,791 | 1/1979 | Clark | 414/480 |
| 5,074,733 | 12/1991 | Hennig | 414/24.5 |

FOREIGN PATENT DOCUMENTS

| | | | |
|---|---|---|---|
| 7703683 | 10/1978 | Netherlands | 414/24.5 |
| 1250207 | 8/1986 | U.S.S.R. | 414/111 |

Primary Examiner—Janice L. Krizek
Attorney, Agent, or Firm—R. Darryl Burke; McKool Smith

[57] ABSTRACT

A transport apparatus to load and transport at least one bail of hay comprises a goose-neck assembly and a trailer. The goose-neck assembly is attachable to a towing vehicle. The trailer is attached to the goose-neck assembly and able to pivot about at least one axis, so that one portion of the trailer can be lowered to a first position. The first position is that at least one bail of hay can be loaded onto at least one portion of the trailer. A motor, which is controllable by an operator in the towing vehicle, can be used that automatically raises and lowers the at least one portion of the trailer into the first position. The goose-neck assembly is also motorized with a motor, so that the goose-neck assembly can orient the trailer into a position horizontal to the towing vehicle. A motor can also be used to raise and lower prongs, which are used to secure a bail of hay and transport a bail of hay to the trailer. The trailer also has at least one motorized transport mechanism to transport at least one bail of hay from the first portion of the trailer to a second portion of the trailer, such as a motorized chain having at least one tooth to grip and secure the at least one bails of hay.

11 Claims, 3 Drawing Sheets

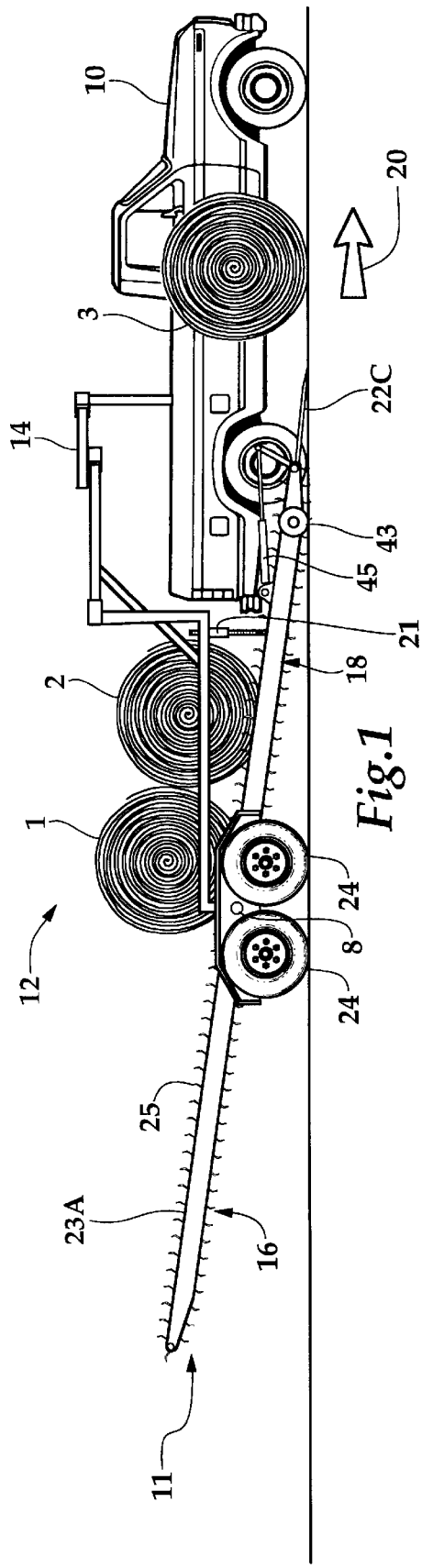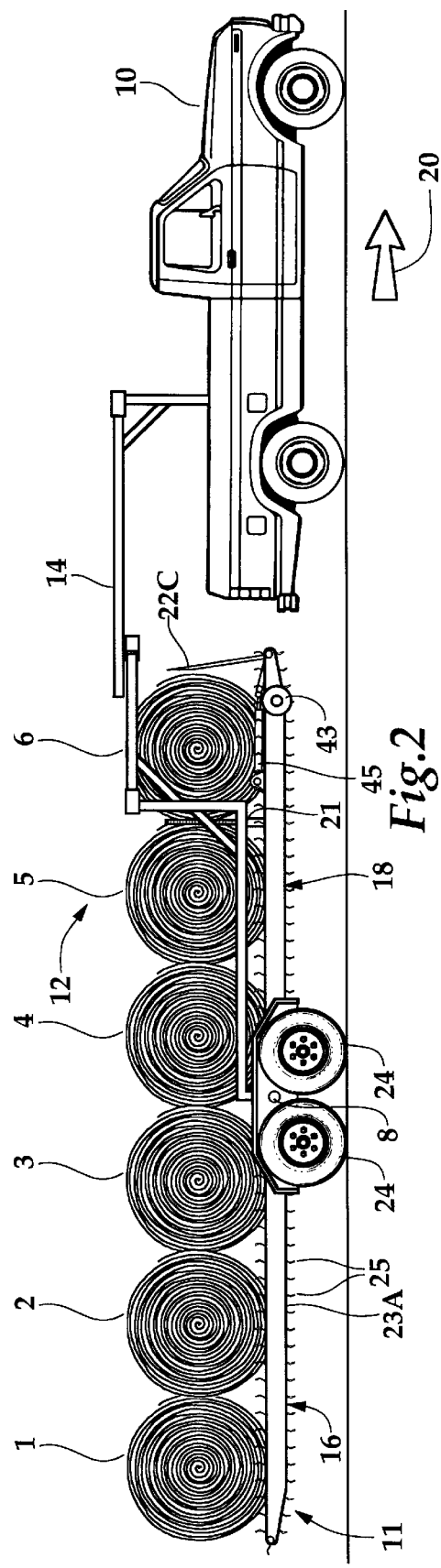

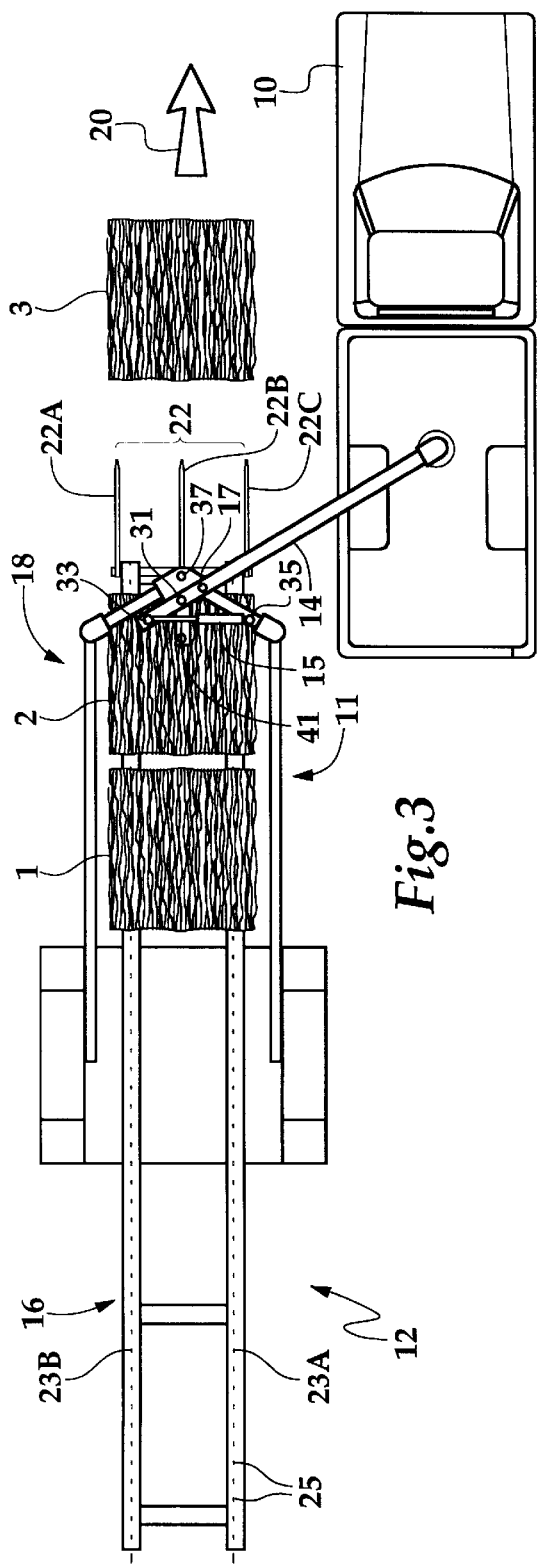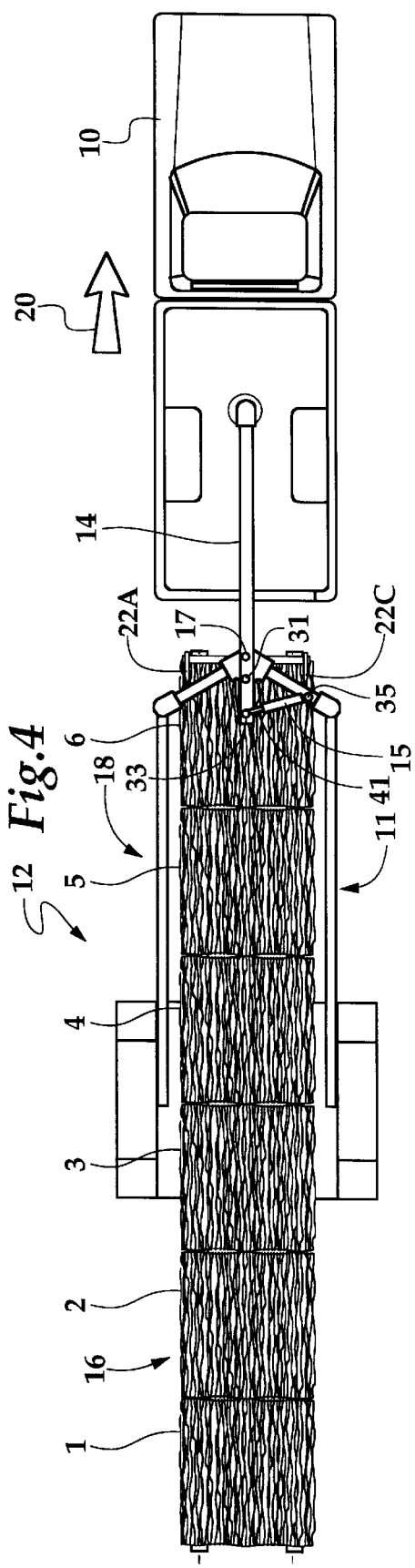

FRONT LOADING GOOSE NECK TRAILER

©Copyright. 1998. Melvin C. Eiland. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

1. Field of the Invention

The present invention generally relates to the field of farm equipment and processes used to load and haul bails of hay and particularly relates to loading and hauling systems and processes comprised of loading apparatus and a trailer.

2. Background

The loading and hauling of bails of hay can be improved in a number of ways. Once bails of hay are created and left in the field, traditional techniques of gathering and hauling these bails of hay require the use of two (2) pieces of equipment—a crane of some sort to pick up and move the bails of hay to a truck or trailer, which necessitate more than one operator to load and unload the bails of hay. This is expensive and troublesome.

SUMMARY

The disclosed invention pertains to an apparatus and to related systems that are used to load and haul bails of hay.

Preferred embodiments load and transport at least one bail of hay and are comprised of a goose-neck assembly and a trailer. The goose-neck assembly is attachable to a towing vehicle. The trailer is attached to the goose-neck assembly and able to pivot about at least one axis, so that one portion of the trailer can be lowered or rotated into a first position. The first position is such that at least one bail of hay can be loaded onto at least one portion of the trailer and, then, if desired, moved around on the trailer itself (i.e., from the front of the trailer to the back of the trailer or vice versa). A motor, which is controllable by an operator in the towing vehicle, can be used to automatically raise and/or lower at least one portion of the trailer into the first position. The goose-neck assembly is also motorized with a first motor, so that the goose-neck assembly can orient the trailer into a position parallel to the towing vehicle, which thereby enables the loading of a bail of hay on the front portion of the trailer. As stated above, the trailer also has at least one motorized transport mechanism to transport at least one bails of hay from the first portion of the trailer to a second portion of the trailer, such as a motorized chain having at least one tooth to grip and secure at least one bail of hay.

Preferred embodiments provide a number of advantages, important functions and key features. In particular, preferred embodiments are self-loading and unloading and, thus, only require one operator. Preferred embodiments are also able to haul five (5) or six (6) bails of hay at one time. Preferred embodiments are also able to load from the front of the trailer, as opposed to the side or rear of the trailer, which, among other things, makes it easier for the operator to control. Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIG. 1 is a cross-sectional view of pick-up truck 10 towing a preferred embodiment of front loading goose neck trailer 12 in the process of loading bails of hay 1, 2, and 3;

FIG. 2 is a cross-sectional view of pick-up truck 10 towing a preferred embodiment of front loading goose neck trailer 12, which is fully loaded with bails of hay 1, 2, 3, 4, 5, and 6;

FIG. 3 is a top view of a pickup truck 10 towing a preferred embodiment of front loading goose neck trailer 12 in the process of loading bails of hay 1, 2, and 3;

FIG. 4 is a top view of pickup truck 10 towing a preferred embodiment of front loading goose neck trailer 12, which is fully loaded with bails of hay 1, 2, 3, 4, 5, and 6;

DETAILED DESCRIPTION OF THE PREFERRED EMBODIMENT

Figure 5:
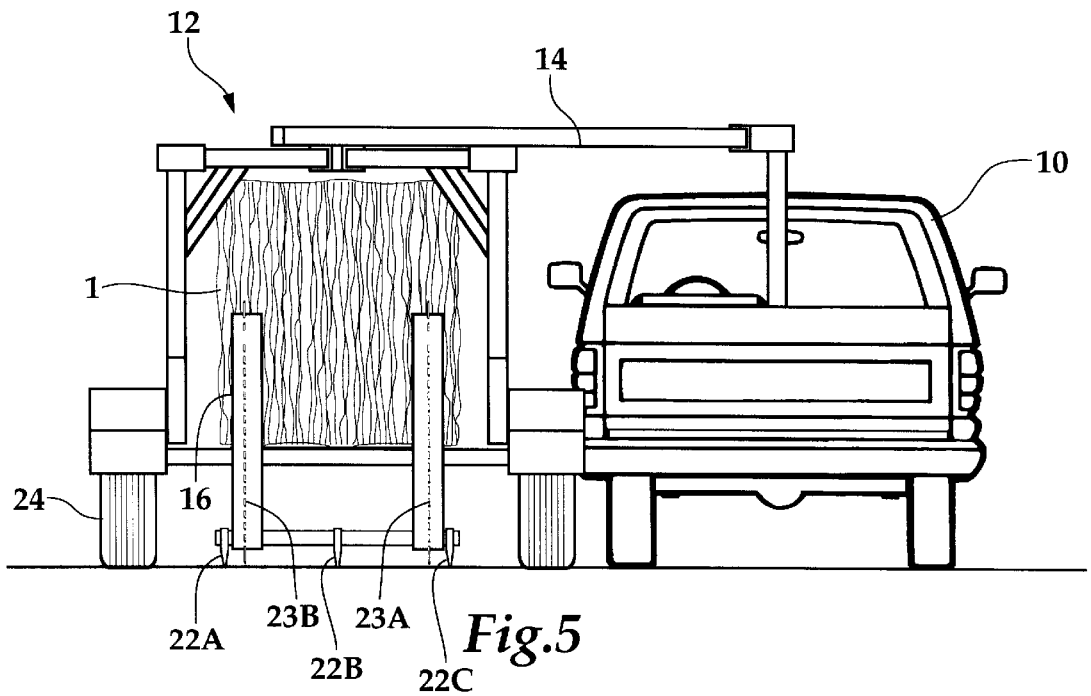
FIG. 5 is a rear view of pick-up truck 10 towing a preferred embodiment of front loading goose neck trailer 12 in the process of loading bail of hay 1.

The preferred embodiment will be described by referring to apparatus showing various examples of how the inventions can be made and used. When possible, like reference characters are used throughout the several views of the drawing to indicate like or corresponding parts.

FIG. 1, FIG. 3, and FIG. 5 show the preferred embodiment of front loading goose neck trailer 12 in the process of loading bails of hay 1, 2, and 3. FIG. 1 is a side view; FIG. 3 is a top view; and FIG. 5 is a rear view. Note FIG. 1 shows bails of hay 1, 2, and 3 being loaded on the passenger side of pick-up 10, whereas FIG. 3 shows bails of hay 1, 2, and 3 being loaded on the driver side of pickup 10. Front loading goose neck trailer 12 is generally comprised of flat trailer 11 and goose neck assembly 14. Flat trailer 11 is generally comprised of a front portion 18 and a rear portion 16. Goose neck assembly 14 is preferably motorized by motor 15 and controlled by the driver of pickup truck 10. Goose neck assembly 14 is used to direct or orient flat trailer 11 away from pickup truck 10, so that flat trailer 11 moves alongside of pick-up truck 10, as pick-up truck 10 is traveling in the forward direction 20. Motor 15 of goose neck assembly 14 is preferably a 12 volt D.C. linear actuator, such as that described on page 51 of the Northern Hydraulics, Inc. catalog. As shown in FIG. 3, as motor 15 extends arm 41, flat trailer 11 is oriented away from pick-up truck 10 and, as pickup truck 10 moves in direction 20, flat trailer 11 eventually moves along side pickup truck 10. Motor 15 and arm 41 are positioned between points 33 and 35. Front loading goose neck trailer 12 is oriented around pivot point 31, as arm 41 is extended and retracted by motor 15. Wheel 43 prevents prongs 22A, 22B, and 22C from being stud, into the ground. Although not shown, a side could also be used in addition to or in lieu of wheel 43.

Once along side pick-up truck 10, front trailer portion 18, which is the portion of flat trailer 11 that is nearest pick-up truck 10, is lowered. Flat trailer 11 pivots about axis 8. One or more pairs of wheels 24 are also preferably positioned in close proximity to axis 8 to stabilize axis 8. Pairs of wheels 24 can actually use axis 8. However, if more than one pair of wheels 24 are used, flat trailer 11 must be selectively attached to some or all of the wheel axis to enable flat trailer 11 to pivot about axis 8.

Motor 21, which is preferably hydraulic and also controlled remotely by the operator of pick-up truck 10, controls the raising and lowering of front trailer portion 18 of flat trailer 11. Once flat trailer 11 is in the "down" position, forked assembly 22, which has prongs 22A, 22B, and 22C, is lowered as well. Prongs 22A, 22B, and 22C spike bails of hay 1, 2, 3, etc. and raise and transport bails of hay 1, 2, 3, etc. to front trailer portion 18 of flat trailer 11. Alternatively, prongs 22A, 22B, and 22C travel beneath bails of hay 1, 2, 3, etc. and when raised bails of hay 1, 2, 3, etc. travel or roll down prongs 22A, 22B, and 22C onto front trailer portion 18 of flat trailer 11. Motor 45 raises and lowers forked assembly 22, having prongs 22A, 22B, and 22C. When bails of hay 1, 2, 3, etc. arrive on front trailer portion 18 of flat trailer 11, motorized chains 23A and 23B, having at least one tooth 25, secures bails of hay 1, 2, 3, etc. and transports bails of hay 1, 2, 3, etc. back toward the rear trailer portion 16 of flat trailer 11, away from pick-up truck 10. Chains 23A and 23B are preferably turned or powered with an electric motor or an electric winch, such as that described on page 145 of the Northern Hydraulics, Inc. catalog. Bails of hay may also need to be secured in position with chains, hooks, rope, etc, which are not shown in the Figures, but could be easily added.

Bails of hay 1, 2, 3, etc. are unloaded by using the reverse procedure. Specifically, flat trailer 11 is pivoted around axis 8 in the down position and prongs 22A, 22B, and 22C, are also in the down position, motorized chains 23A, 23B transport bails of hay 1, 2, 3, etc. toward the front trailer portion 18 of flat trailer 11, toward pickup truck 10. Alternatively, bails of hay 1, 2, 3, etc. can in certain circumstances be transported off the rear trailer portion 16 of flat trailer 11 when flat trailer 11 is in a normal, horizontal position or, perhaps, pivoted around axis 8 backwards, so that the rear trailer portion 16 of flat trailer 11 is actually lowered.

Figure 6:
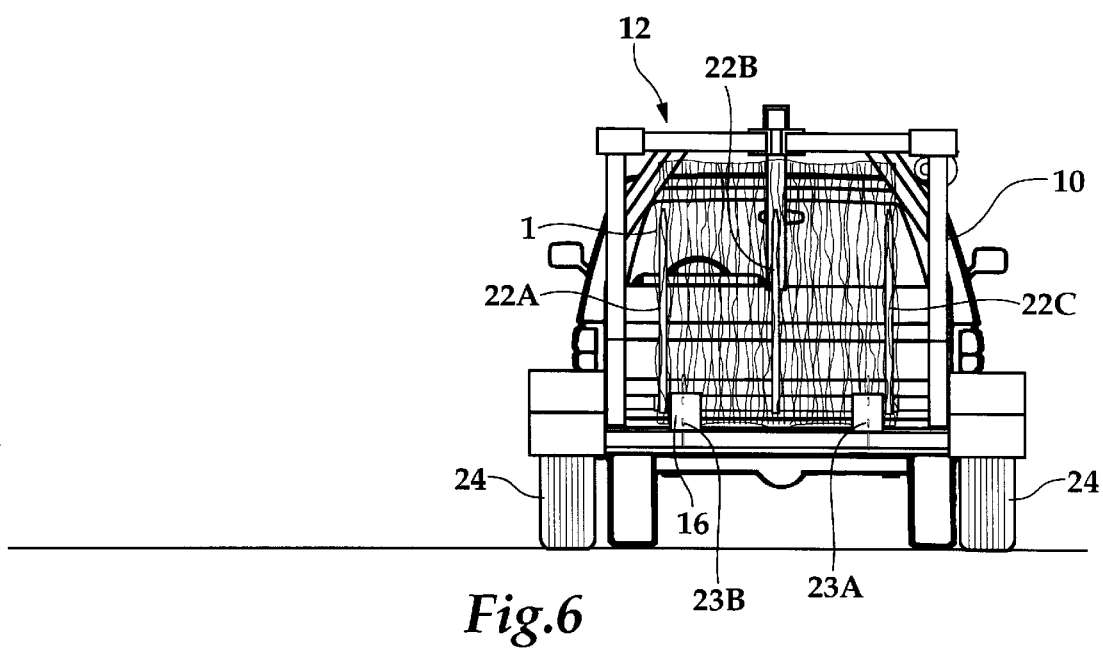
FIG. 6 is a rear view of pick-up truck 10 towing a preferred embodiment of front loading goose neck trailer 12, which is loaded with bail of hay 1.

FIG. 2, FIG. 4, and FIG. 6 show pick-up truck 10 towing a preferred embodiment of front loading goose neck trailer 12 along direction 20, which is fully loaded with bails of hay 1, 2, 3, 4, 5, and 6. FIG. 2 is a side view; FIG. 4 is a top view; and FIG. 6 is a rear view. Note flat trailer 11 has already pivoted back in a position behind pickup truck 10 and prongs 22A, 22B, and 22C have been retracted into the upward position. Goose neck assembly 14 is also directly behind pick-up truck 10 and secured with a safety pen or other locking mechanism at pivot point 31, and openings 17 and 37 (see FIG. 3) to prevent front loading goose neck trailer 12 from swinging while being towed and/or to prevent front loading goose neck trailer 12 from swinging, if motor 15 is accidentally engaged. The safety pen or locking mechanism is preferably pulled by hand for safety reasons.

Further Modifications and Variations

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, other vehicles can be used to tow trailer 12. Similarly, while electric motors or electric winches are preferred to power chains 23A and 23B, chains 23A and 23B could be moved with manual winches, described on page 145 of the Northern Hydraulics, Inc. catalog. Motors 15, 21, and 45 and the winches used to power chains 23A and 23B are preferably hydraulic or electric. If desired and the winches and motor are electric, motors 15, 21, and 45 are selectable electrically coupled via electrical wiring or cables to a 12 volt battery, such as the one found in pick-up 10, but could also be powered by alternate power sources, such as a separate 12 volt battery or the like. Also, while the preferred embodiment is front loading, it is conceivable that the invention could be adapted to be rear loading. Finally, while the preferred embodiment works best with round bales of hay, the preferred embodiment could also be adapted to work with square bales of hay.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. A transport apparatus to load and to transport at least one bail of hay, comprising:
   (a) a goose-neck assembly, said goose-neck assembly attachable to a towing vehicle; and
   (b) a trailer attached to said goose-neck assembly, said trailer able to pivot about at least one axis, so that one portion of said trailer can be lowered to a first position, said first position such that said at least one bail of hay can be loaded onto said one portion of said trailer, wherein said trailer further has at least one prong attached to said one portion of said trailer, said at least one prong able to be lowered, said at least one prong to aid in moving said at least one bail of hay from a ground position to said trailer.

2. The transport apparatus of claim 1, further comprising:
   (c) a motor to automatically raise and lower said one portion of said trailer into said first position.

3. The transport apparatus of claim 2, wherein said motor is controllable by an operator in said towing vehicle.

4. The transport apparatus of claim 1, wherein said goose-neck assembly is also motorized with a first motor, so that said goose-neck assembly can orient said trailer into a position along side said towing vehicle.

5. The transport apparatus of claim 1, wherein said trailer has at least one motorized transport mechanism to transport said at least one bail of hay from said one portion of said trailer to a second portion of said trailer.

6. The transport apparatus of claim 5, wherein said at least one motorized transport mechanism is a motorized chain having at least one tooth to grip and secure said at least one bail of hay.

7. A trailer to load and transport a bail of hay, comprising:
   (a) a towing assembly selectively attachable to a towing vehicle; and
   (b) a flat bed selectably attached to said towing assembly, said flat bed adapted to pivot about an axis, so that one portion of said flat bed can be lowered to a downward position so that said bail of hay can be loaded onto said flat bed, wherein said flat bed further has at least one prong attached to a first portion of said flat bed, said at least one prong able to be lowered when said flat bed is in said downward position, and further wherein said flat bed has at least one motorized transport mechanism to transport said bail of hay from said first portion of said flat bed to a second portion of said flat bed, said at least one motorized transport mechanism is a motorized chain having at least one tooth to grip and secure said bail of hay.

8. The trailer of claim 7, further comprising:
   (c) a motor to automatically raise and lower said flat bed into said downward position.

9. The trailer of claim 7, wherein said motor is controllable by an operator.

10. The trailer of claim 7, wherein said towing assembly is also motorized to selectively orient said trailer into a position parallel to said towing vehicle.

11. The trailer of claim 7, wherein said towing assembly is a goose-neck assembly.

* * * * *